May 5, 1970 R. E. LATHAM ET AL 3,509,908
CHECK VALVE

Filed Nov. 29, 1967 3 Sheets-Sheet 1

INVENTORS
RAYMOND E. LATHAM
MARVIN L. HOLBERT, JR
BY
Cushman, Darby & Cushman
ATTORNEYS

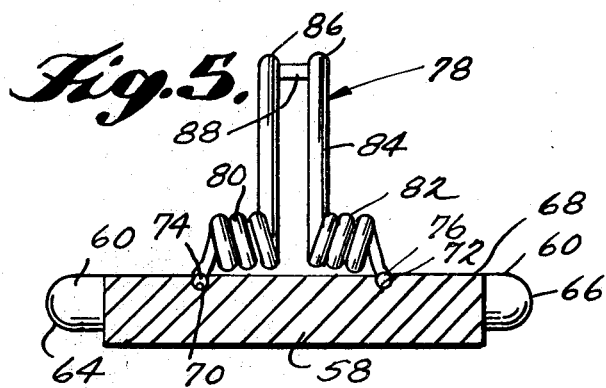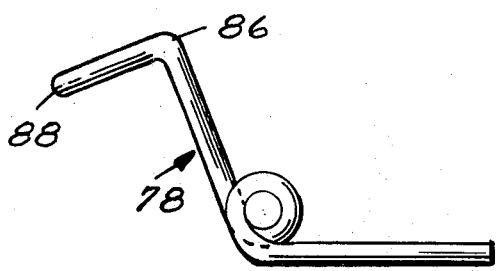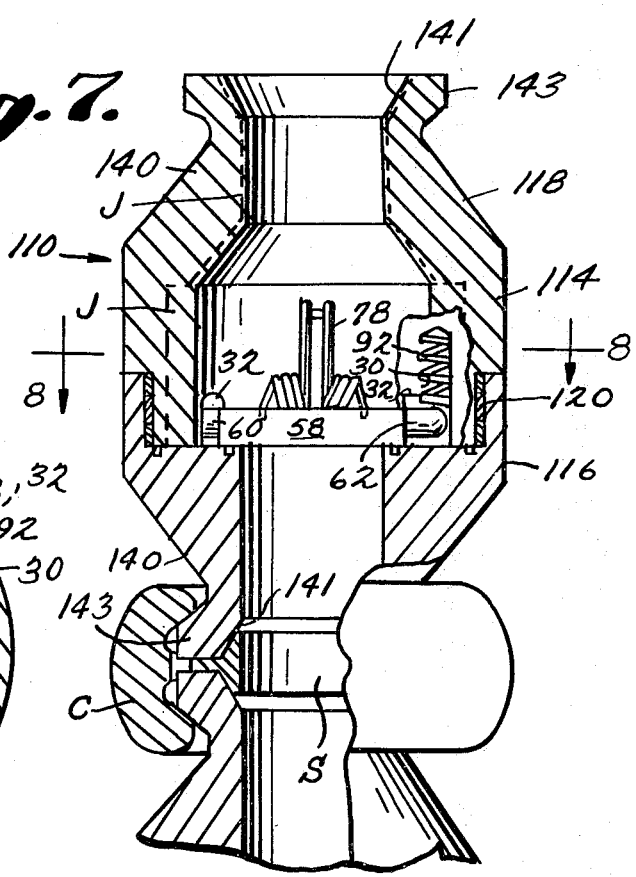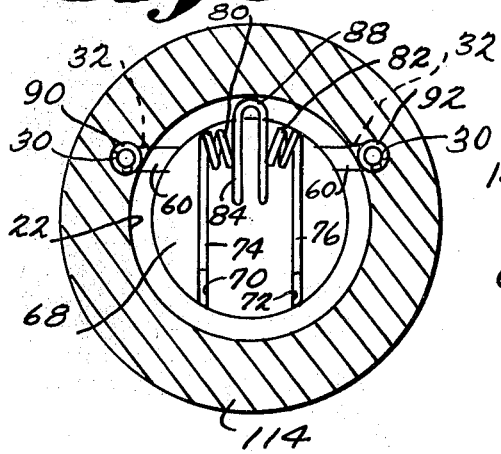

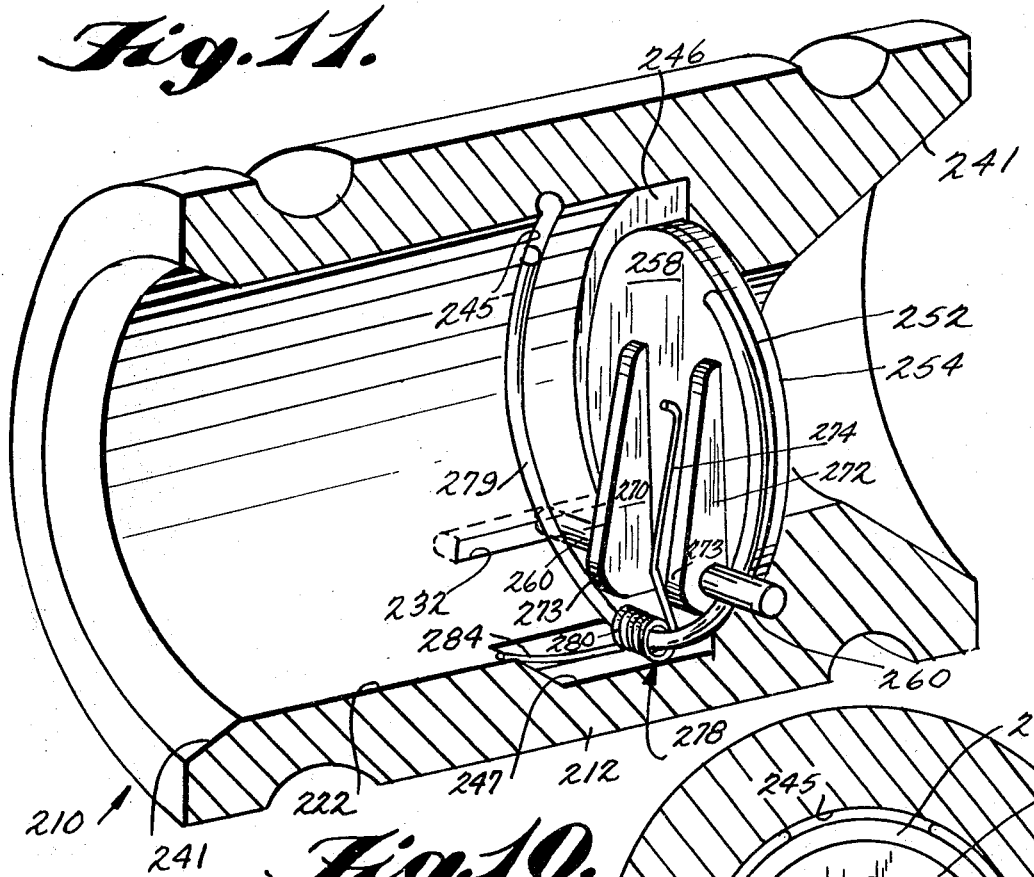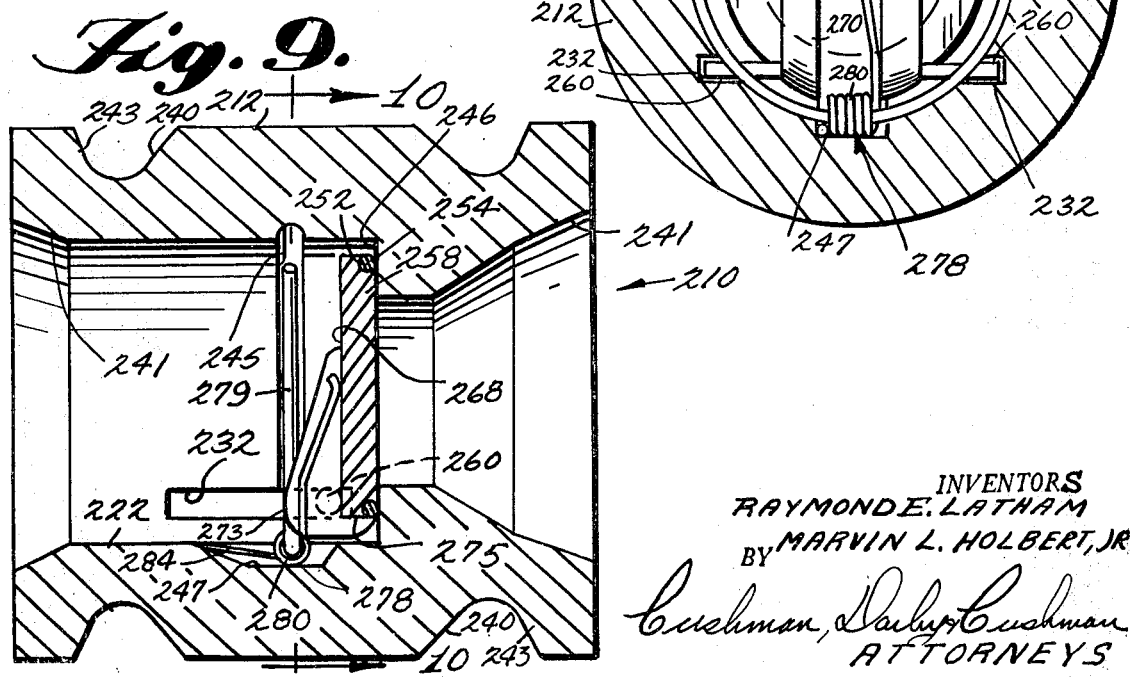

United States Patent Office 3,509,908
Patented May 5, 1970

3,509,908
CHECK VALVE
Raymond E. Latham and Marvin L. Holbert, Jr., Houston, Tex., assignors to Gray Tool Company, Houston, Tex., a corporation of Texas
Filed Nov. 29, 1967, Ser. No. 686,434
Int. Cl. F16k 15/03
U.S. Cl. 137—527                                    14 Claims

ABSTRACT OF THE DISCLOSURE

A radially directed annular shoulder in the housing through passageway seats a flapper having opposed trunnions nearer one edge. The trunnions are received in sockets elongated axially to allow movement of the trunnions away from the seat. Springs received in the sockets urge the trunnions toward the seat. Another spring presses the flapper toward the seat. The cross-sectional area of the housing passageway at the immediately downstream of the flapper trunnions remains circular, but is larger in area to accommodate the fluid flow plus the volume of the flapper when the valve is open. As flow is directed against the flapper from the upstream side, the axial springs compress and the flapper moves off the seat. At the same time, the flow tends to rotate the flapper about the axis of the trunnions which are acting against the axial springs. When fully open, only a small portion of the edge of the flapper is exposed to the flowing media; hence, a low pressure drop is experienced.

BACKGROUND AND SUMMARY OF THE INVENTION

In order to overcome certain drawbacks of presently available check valves, the valve of the present invention is full opening within a round, rather than T-shaped, chamber; has no spatial orientation limitation; is of simple construction; provides laminar flow through; has spring-energized clapper seating; is silent and smooth in operation; is easy to install, compact, light in weight and relatively economical.

The check valve of the invention includes a housing having a through bore or passageway. A radially directed annular shoulder in the housing through passageway seats a flapper having opposed trunnions nearer one edge. The trunnions are received in sockets elongated axially to allow movement of the trunnions away from the seat. Springs received in the sockets urge the trunnions toward the seat. Another spring presses the flapper toward the seat. The cross-sectional area of the housing passageway at the immediately downstream of the flapper trunnions remains circular, but is larger in area to accommodate the fluid flow plus the volume of the flapper when the valve is open. As flow is directed against the flapper from the upstream side, the axial springs compress and the flapper moves off the seat. At the same time, the flow tends to rotate the flapper about the axis of the trunnions which are acting against the axial springs. When fully open, only a small portion of the edge of the flapper is exposed to the flowing media; hence, a low pressure drop is experienced.

The principles of the invention will be further hereinafter discussed with reference to the drawings wherein preferred embodiments are shown. The specifics illustrated in the drawings are intended to exemplify rather than limit aspects of the invention as defined in the claims.

BRIEF DECRIPTION OF THE DRAWINGS

FIG. 5 is a sectional view taken along the line 5—5 of FIG. 4;

FIG. 6 is a side elevation view of the spring of FIGS. 4 and 5;

FIG. 7 is a longitudinal sectional view, similar to FIG. 2 of a second embodiment of the valve; and FIG. 8 is a transverse sectional view taken substantially along the line 8—8 of FIG. 7;

FIG. 9 is a longitudinal sectional view, similar to FIGS. 2 and 7, of a third embodiment of the valve;

FIG. 10 is a transverse sectional view taken substantially along line 10—10 of FIG. 9; and FIG. 11 is a perspective view of the value of FIGS. 9 and 10, the forward longitudinal half of the housing having been cut away to expose the interior of the valve.

Figure 1:
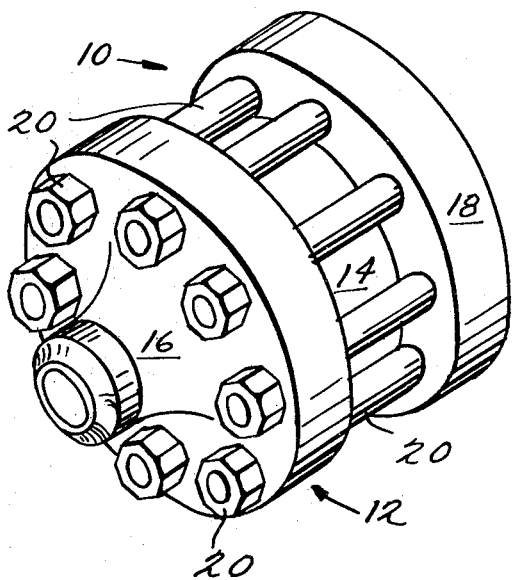
FIG. 1 is a perspective view of one embodiment of the new check valve.

In the following discussion of the valve embodiments shown in the drawings, various references are made to dimensions and materials in order to assist those skilled in the art in understanding the presently preferred modes of practicing hte invention. These particulars, however, are provided to illustrate the invention, not to limit the scope thereof.

Referring to FIGS. 1–6, the valve 10 includes a housing 12 comprising a central tubular section 14 and two opposite end flanges 16, 18 all held together by nut and bolt assemblies 20.

The central section 14 has a cylindrical bore 22 providing the chamber of the housing. In the example, the central section 14 has an O.D. of 5.25 inches, an I.D. of 3.25 inches and a length of about 2.81 inches and has two generally radially extending, axially oppositely facing, annular ends 24, 26. Two axially aligned sockets 28, 30, for instance 1.5 inches deep and 0.375 inch in diameter are provided in the central section 14, opening through the end 24. The centers of the sockets 28, 30 are on a line parallel to a diameter $D_1$ of the central section 14, displaced 0.818 inch from the diameter $D_1$; and are located 1.687 inches on opposite sides of a diameter $D_2$, perpendicular to the diameter $D_1$. A thin wall of the central section thus separates the sockets 28, 30 from the chamber 22. For 0.75 inch adjacent and leading to the end 24 of the central section, this thin wall is cut away at two slots 32, 34 which project toward one another in alignment laterally of the central section 14.

The end flanges 16, 18 are generally similar and may be produced by modification of identical parts, for instance 2.0-inch, 900-pound A.S.A. flanges of the type constructed to be butt welded to schedule 160 pipe. The end flanges 16, 18 have in common a throughbore 36, a radially enlarged bolt flange 38 at one end and a neck 40 at the other for welding to pipe. In the example, the bores 36 are of 1.69 inches diameter and eight equally angularly spaced, axially directed bolt holes 42 of 1.0 inch diameter are drilled through each flange 38 on a 6.5 inch diameter bolt circle. A cylindrical recess 44 having a depth of $\frac{1}{16}$ inch and a diameter slightly greater than the O.D. of the housing central section 14 is concentrically formed in the end face 46 of each bolt flange. Within each recess, a concentric groove 48 is provided for receipt of an annular resilient seal ring or O-ring 50 to seal between respective bolt flange ends and housing central section ends. Obviously, the grooves 48 could be alternatively located in the housing central section ends 24, 26.

Now, proceeding to discuss the differences between the flanges 16 and 18, the end face 46 of the flange 16, adjacent and coaxial with the bore 36 juncture with the end face 46, is provided with an annular groove 52 for receipt of an annular resilient seal ring or O-ring 54. The groove 52 is smaller at its greatest diameter than the I.D. of the housing central section 14. The bore 36 of the flange 18 is conically enlarged adjacent and toward its opening through the end face 46, for instance at a 60 degree angle so as to have a diameter, at said opening, corresponding to the I.D. of the housing central section 14.

The valve 10 further includes a disk 58 shown being circular in plan and having two opposed trunnions 60 extending therefrom in axial alignment on a line parallel to a diameter $D_1$ of the disk corresponding in orientation and placement to the slots 32, 34. In the example, the disk has a diameter of 2.625 inches, a thickness of 0.5 inch, the trunnions welded in place, at 62, of 0.365 inch diameter rod ground at the ends 64, 66 to generally hemispherical shape, the length from end 64 to end 66 being 3.744 inches. The trunnions 60 are flush with the rear face 68 of the disk 58.

Figure 4:
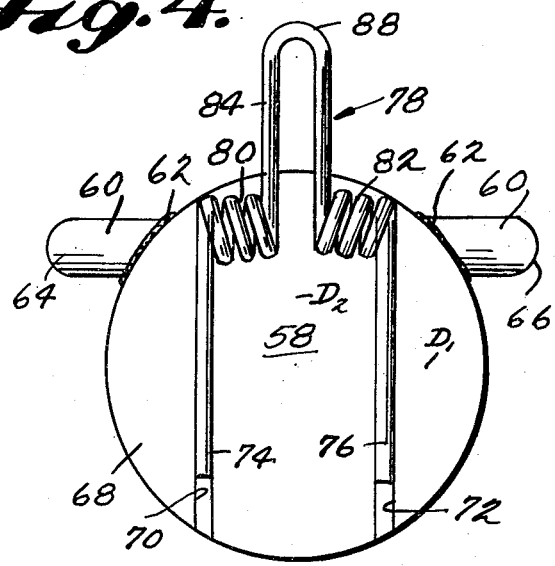
FIG. 4 is a top plan view of the valve clapper and spring.

As seen best in FIGS. 4 and 5, two straight grooves 70, 72 are formed in the disk rear face 58 on opposite sides of the diameter $D_2$ thereof. In the example, the grooves 70, 72 are 0.125 inch deep, 0.125 inch wide and 1.375 inches from outer edge of one to outer edge of other.

The grooves 70, 72 receive the outer legs 74, 76 of a torsion spring 78 (shown by itself in FIG. 6). The torsion spring 78 includes a first horizontal outer leg 74 proceeding parallel to $D_2$ of the disk and connected at its inner end to a horizontal laterally inwardly proceeding coil 80 in a first sense, proceeding parallel to $D_1$ of the disk; a second horizontal, outer leg 76 proceeding parallel to $D_2$ of the disk and connected at its inner end to a laterally inwardly proceeding coil 82 in an opposite sense, proceeding parallel to $D_1$ of the disk; and a center looped leg 84 connected at one end to the coil 80 and at the other end to the coil 82. The coils 80 and 82 are aligned on a horizontal axis. The leg 84, of the example, when unstressed proceeds at a 110 degree angle up and rearward from the plane of the outer legs 74, 76 until points 86 whereupon it bends down 90 degrees to its former extent forming a tip portion 88. A suitable material for fabrication of the spring 78 is Inconel wire.

The valve of FIGS. 1–6 further includes two 0.360 inch O.D. compression coil springs 90, 92, to be respectively received in the sockets 28, 30.

In the example, the spring 78 has a force constant of 20 pounds/inch torsional movement about the coil axis and the springs 90, 92 a force constant of 10 pounds/inch of compression.

Figure 2:
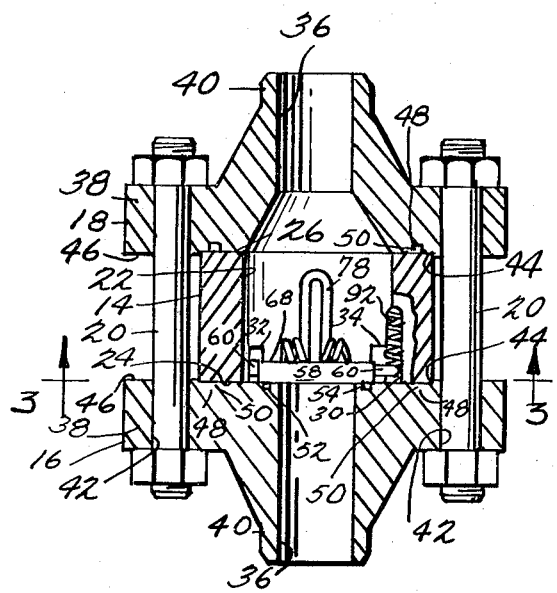
FIG. 2 is a longitudinal sectional view of the valve of FIG. 1.
Figure 3:
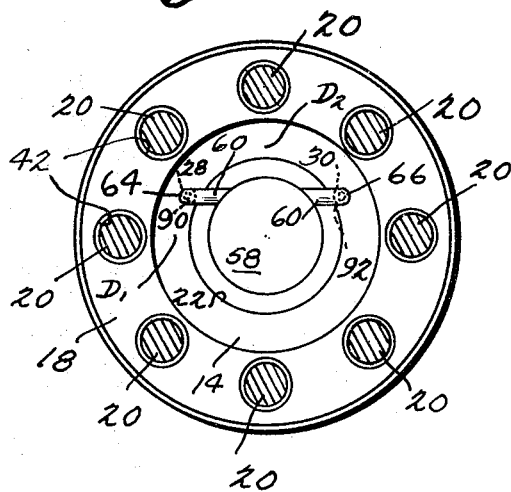
FIG. 3 is a sectional view of the valve from the aspect of line 3—3 of FIG. 2.

In assembling the valve of FIGS. 1–6, the O-ring seals are installed in the appropriate grooves as described, the springs 90, 92 slid into respective sockets 28, 30, and the spring 78 mounted on the disk rear face. The disk is then placed adjacent the end 24 of the central section 14 and the housing portions 14, 16, 18 aligned as shown in FIG. 2 and brought axially together by installing and tightening the nut and bolt assemblies 20. The recesses 44 guide centering of the central section 14.

The valve 10 may then be installed in piping by butt welding the flange necks 40 to axially aligned, spaced pipe ends. Should repair, replacement, cleaning, etc. of the valve working parts be needed, this may be done with the flanges still welded on the piping, by removing the nut and bolt assemblies 20, and axially spreading the piping sufficiently to laterally slide the section 14 out for the necessary operation. Reinstallation comprises a reversal of these latter steps.

The provision of bolt flanges and nut and bolt assemblies to pull and hold the valve 10 together is easy, and allows use of parts which are familiar enough to technicians in the art that little special instruction is necessary for such to correctly install or service such valves. Obviously, other devices than nut and bolt assemblies could be used to draw and hold the housing parts axially together, for instance any of the arrangements shown in the U.S. patent of Brown, 3,307,862.

A housing modification is shown in FIGS. 7 and 8, wherein the operating parts of the valve remain as discussed above in relation to FIGS. 1–6.

Basically, in FIGS. 7 and 8, the valve 110 housing central section 114 has been integrally merged with one end section 118. The two resulting sections thread together centrally at 120 for assembly and disassembly of the valve and the outer ends of the two valve housing section necks 140 are provided with special internal, frustoconical sealing ring seat surfaces 141 and contractile-expansible clamp connector receiving outer flanges 143 for respectively receiving sealing rings S and clamps C, for instance of the types shown and described in the Composite Catalogue of Oil Field Equipment and Services, 1966–1967 Edition, Gulf Publishing Company, Houston, pages 2098, 2099, 2102–2105. The threading at 120 could likewise be replaced by a pair of flanges similar to the flanges 143, receiving a ring S between them and having a clamp C maintaining the connection. The separate rings S could be made ribless or integral with one housing section as described in the aforementioned U.S. patent of Brown. In the example, the external threading and internal threading 120 respectively comprise: 4⅝–12 UN–2A, pitch diameter=4.569−0.007 inches, minor diameter 4.521 inches and 4⅝–12 UN–2B, pitch diameter=4.578 +0.007 inches, major diameter 4.625 inches.

Material suitable for fabrication of the valve will occur to those skilled in the art and will vary depending upon the harshness of the environment in which the valve is to serve. Steel is a preferred fabricating material for general service, stainless steel may also be used. In certain applications a saving of cost may be effected by installation of a corrosion resistant cladding or liner sleeve on a less strong or less expensive base, for instance a stainless steel sleeve in a carbon steel jacket. An exemplary jacket and sleeve are delineated by dashed lines J in FIG. 7.

The valve 10 shown in FIGS. 1–6 is intended for relatively low pressure application, for instance up to 1000 p.s.i.; the valve 110 shown in FIGS. 7 and 8, incorporating the special sealing hubs, is suited for higher pressure systems, for instance up to 30,000 p.s.i. In both of the embodiments as flow is directed against the flapper from the upstream side, the axial springs compress and the flapper moves off the seat. At the same time, the flow tends to rotate the flapper about the axis of the trunnions which are acting against the axial springs. When fully open, only a small portion of the edge of the flapper is exposed to the flowing media; hence, a low pressure drop is experienced.

The torsion spring of the examples is preloaded, for instance pressing the valve disk against the resilient sealing ring 54 at the seat 55. As seen best in FIGS. 3 and 8, the O.D. of the valve disk is intermediate the I.D. of the end flange 16 bore and the I.D. of the central portion 14 cylindrical chamber.

A further presently preferred embodiment of the valve is shown at 210 in FIGS. 9–11. Referring to these figures, the valve 210 includes a one piece tubular housing 212 having a cylindrical bore 222 providing the chamber of the housing. At its opposite ends, the housing 212 is provided with necks 240, internal sealing ring seat surfaces 241, and receiving flanges 243 for contractile-expansible clamps of the type described hereinbefore in relation to FIG. 7.

The bore 222 undergoes a sharp radial enlargement intermediate the length thereof defining an annular, axially downstream-facing shoulder 246, coaxial with the bore. Two longitudinally elongated slots 232 are formed in the housing, opening throughout their length into the bore 222. The slots 232 are aligned in the manner of the slots 32 shown in FIG. 1 and are located just downstream of the valve seat shoulder 246. Intermediate the extent of the slots 232 axially of the housing, the bore 222 is provided with a circumferentially extending, radially inwardly opening snap ring retainer groove 245.

Angularly between the two slots 232, in the shorter circumferential sense, a broad, shallow, axially elongated slot 247 is formed in the housing bore. The slot 247 is shown extending nearly to the opposite ends of the slots 232. The groove 245 intersects all of the slots 232, 247.

The flapper or valve disk 258 of the valve 210 is generally circular in plan and has two laterally spaced, parallel guide ears 270, 272 protruding from the rear thereof. Opposed trunnions 260 oppositely outwardly extend from the guide ears 270, 272 in axial alignment in the same sense as a lateral imaginary line joining the slots 232. The trunnions 260 are approximately tangent to the rear face 268 of the disk 258.

It should now be noticed that the rear surfaces 273 of the guide ears 270, 272 are curved about an axis moved in a path from a point coinciding with the trunnions axis, to a point 275 below the trunnions axis. These may bear against the shoulder 246 to ensure smooth opening and closing of the disk.

A circumferential groove 252 formed in the upstream outer peripheral corner of the disk 258 receives a resilient seal ring 254. Of course, the groove and seal may alternately be provided in the seat 246 or the upstream face of the valve disk may be lapped to provide a metal-to-metal seal with the valve seat 246.

In assembling the valve 210, the disk 258 is inserted in the housing bore from the downstream end thereof in a cocked fashion in order to insert one, and then the other of the trunnions in the slots 232 as the disk is brought to the position shown in the figures.

Next a torsion spring 278 is installed on a split snap ring retainer 279. Although a torsion spring identical to the spring 78 of FIGS. 1–8 may be used, a simpler one is depicted in FIGS. 9–11, having a leg 274, a coil 280 and a leg 284. Installation of the spring 278 on the retainer 279 involves pushing one end of the retainer through the coil 280 and turning the retainer until the spring 278 is located approximately between the ends of the retainer. This assembly is then inserted in the bore 222 from the downstream end thereof and advanced until the retainer 279 snaps into the groove 245. Since the groove is about as deep as the retainer is thick, the retainer 279 does not obstruct flow through the valve. Likewise when the retainer is snapped in place, the bulk of the spring 278 lies in the slot 247. The spring leg 284 engages the housing within the slot 247 and the spring leg 274 engages the rear face of the valve disk, centrally thereof, between the guide ears 270, 272.

Thus the snap ring retainer performs the triple roles of confining the flapper trunnions to the slots 232 mounting the flapper and urging the flapper toward the valve seat.

The torsion spring 278, held firmly by the snap ring retainer, exerts force against the approximate center of the flapper to energize the sealing surfaces of the flapper and seat under low pressure reverse flow, irrespective of the attitude of the valve. The application of spring force at the approximate center of the flapper allows the flapper to move off the seat longitudinally, before rotating about the trunnions axis.

The valve 210 advantages include and improve upon those of the valves 10 and 110 since the valve 210 has few parts, no external parts for possible leakage, is completely disassemblable in the field using simple tools and, though inexpensive, is suitable for high pressure use.

It should now be apparent that the check valve as described hereinabove possesses each of the attributes set forth in the specification under the heading "Background and Summary of the Invention" hereinbefore. Because the check valve of the invention can be modified to some extent without departing from the principles of the invention as they have been outlined and explained in this specification, the present invention should be understood as encompassing all such modifications as are within the spirit and scope of the following claims.

What is claimed is:

1. A valve including: a housing having a longitudinal through passageway, said passageway being generally cylindrically enlarged intermediate the ends thereof to define a chamber delimited at one end by a radially directed annular seat; a valve disk having two aligned trunnions thereon laterally offset from a diameter of the disk; means defining two opposed slots correspondingly laterally offset in said housing, said slots opening into said chamber adjacent said seat, said slots being axially longer than the diameter of said trunnions; said trunnions being received in respective of said slots; means defining two axially extending sockets in said housing in communication with said trunnions downstream from said seat; compression spring means received in said sockets and resiliently pressing said trunnions axially upstream against said housing; and further spring means mounted in said housing against said disk and said housing and resiliently pressing said disk against said seat, whereby upstream fluid flowing against said disk moves said disk downstream by compressing said compression spring means and rotates said disk about said trunnions against restoring force provided by said further spring means; said further spring means comprising a torsion spring having at least one leg bearing against the downstream side of said valve disk and another leg bearing against said housing; said disk further having means defining two laterally spaced grooves in the downstream side thereof, said torsion spring other leg being a central looped leg flanked by two opposite sense spring coils, said one leg extending from one coil, and a further leg extending from the other of said coils, the one and further legs being received in said laterally spaced grooves in said disk.

2. The valve of claim 1 wherein said housing comprises at least two axially adjacent separable portions, said seat being adjacent an end of a first housing portion and said slots and sockets being located in and opening toward an end of a second housing portion; and securement means on said housing portions for axially securely drawing said housing portions toward one another.

3. The valve of claim 2 wherein said securement means comprises complementary threading on said first and second housing portions adjacent said ends.

4. The valve of claim 3 further including means defining a frustoconical internal sealing ring receiving seat in said through passageway adjacent and flaring toward the opposite end of each housing portion, and means defining an external clamp receiving circumferential flange on each housing portion adjacent said opposite end thereof.

5. The valve of claim 2 wherein said first housing portion comprises a first anular end flange, said second housing portion comprises a tubular central section and the housing further includes a second anular end flange; said end flanges abutting opposite ends of said central section; annular sealing ring means received betwen said end flanges and said central section opposite ends sealing said end flanges with respect to said central section; said annular end flanges protruding radially outwardly beyond said central section, said securement means being mounted on the radial protrusions of said end flanges.

6. The valve of claim 5 wherein the securement means comprises means defining a plurality of axially corresponding openings through said end flange radial protrusions, the openings through each end flange radial protrusion being equiangularly spaced; and nut and bolt assemblies secured through corresponding twos of said openings.

7. The valve of claim 5 further including means defining a concentric circular recess in each end flange constructed and arranged to barely circumscribe opposite ends of said central section for guiding said central section to a concentric condition during assembly of the valve and for ensuring said concentric condition during operation of the valve.

8. The valve of claim 1 further including a groove in said seat circumferentially of said through passageway, and a resilient seal ring received in said seat and positioned therein for sealing with said disk.

9. The valve of claim 1 wherein said housing includes an outer casing having a tubular sleeve of corrosion resistant material removably received therein, said chamber being, at last in part, defined by the bore of said tubular sleeve, and said slots and sockets being defined in said sleeve.

10. A valve including: a housing having a longitudinal through passageway, said passageway having means defining a chamber therein intermediate the ends thereof, said chamber being delimited at one end by a radially directed annular shoulder defining a circumferential valve seat; a valve disk having two aligned trunnions thereon laterally offset from a diameter of the disk; means defining two opposed slots in said housing adjacent said seat downstream thereof and elongated axially of said through passageway, said slots opening into said through passageway, said slots being longer axially of the through passageway than the diameter of said trunnions; said trunnions being received in respective of said slots; torsion spring means mounted in said housing against the approximate center of said disk and against said housing, said torsion spring means resiliently pressing said disk against said seat, whereby upstream fluid flowing against said disk moves said disk downstream and rotates said disk about said trunnions against restoring force provided by said torsion spring means.

11. The valve of claim 10 wherein said torsion spring means includes at least one leg disposed against said disk, at least another leg disposed against said housing, and a curved portion intermediate said one leg and said other leg; means defining a groove in said housing through passageway downstream of said valve seat; a retainer fastened in said groove means, said retainer engaging the curved portion of said torsion spring means and retaining said torsion spring means secured in place on said valve.

12. The valve of claim 11 wherein said torsion spring means curved portion comprises a spring coil; said groove means comprises a circumferential, radially inwardly opening groove, and said retainer comprises a split snap ring retainer threaded through said coil and snapped into said groove to retain said torsion spring means.

13. The valve of claim 12 wherein said housing essentially comprises a one-piece tubular member having conduit connection means at each end thereof; the through passageway between said seat and the downstream end thereof being of sufficiently greater diameter than said valve disk to permit installation of said disk through said downstream end in a cocked, then straightened fashion for disposing one then the other of the trunnions in the respective slots.

14. A valve including: a housing having a longitudinal through passageway, said passageway having means defining a chamber therein intermediate the ends thereof, said chamber being delimited at one end by a radially directed annular shoulder defining a circumferential valve seat; a valve disk having two aligned trunnions thereon laterally offset from a diameter of the disk; recess means defined in said housing adjacent said seat downstream thereof, said recess means including two opposed groove portions opening into said through passageway, said recess means being longer axially of the through passageway than the diameter of said trunnions; said trunnions being received in respective of said recess means two opposed groove portions; torsion spring means mounted in said housing, said torsion spring means including at least one leg disposed to bear against said disk in such sense as to urge said disk toward said seat, at least another leg disposed against said housing, and a curved portion intermediate said one leg and said other leg; further recess means defined in said housing through passageway downstream of said seat and extending angularly thereof, said further recess means including groove means opening into said through passageway, a retainer resiliently, removably received in the last-mentioned groove means, means between said retainer ring and said torsion spring for transmitting retaining force from said retainer to said torsion spring whereby said torsion spring other leg is maintained in position to bear against said housing; said torsion spring means resiliently pressing said disk against said seat, whereby upstream fluid flowing against said disk moves said disk downstream and rotates said disk about said trunnions against restoring force provided by said torsion spring means.

References Cited

UNITED STATES PATENTS

| | | | |
|---|---|---|---|
| 2,956,582 | 10/1960 | Pranter | 137—527 XR |
| 3,276,471 | 10/1966 | Hagner | 137—527 |
| 3,378,030 | 4/1968 | Cary | 137—515.7 |
| 3,395,727 | 8/1968 | Weise | 137—515.7 XR |

WILLIAM F. O'DEA, Primary Examiner

W. H. WRIGHT, Assistant Examiner

U.S. Cl. X.R.

137—515, 515.7, 527.2, 527.4